United States Patent [19]

Narumiya et al.

[11] 4,308,233
[45] Dec. 29, 1981

[54] DEVICE FOR PURIFICATION OF EXHAUST GAS

[75] Inventors: Tsuneaki Narumiya, Yokohama; Seiji Izuhara, Aichi, both of Japan

[73] Assignee: Bridgestone Tire Company Limited, Tokyo, Japan

[21] Appl. No.: 154,667

[22] Filed: May 30, 1980

[30] Foreign Application Priority Data

Mar. 10, 1980 [JP] Japan .................................. 55-30068
Mar. 10, 1980 [JP] Japan .................................. 55-30069

[51] Int. Cl.³ .......................... F01N 3/02; F01N 3/28; F01N 7/16
[52] U.S. Cl. .................. 422/169; 252/477 R; 422/180
[58] Field of Search ................ 422/169–171, 422/180; 252/466 PT, 477 R

[56] References Cited

U.S. PATENT DOCUMENTS

| | | | |
|---|---|---|---|
| 3,154,389 | 10/1964 | Hayes et al. | 422/169 |
| 3,228,755 | 1/1966 | Lottinville | 422/171 |
| 3,429,656 | 2/1969 | Taylor et al. | 422/171 |
| 3,833,386 | 9/1974 | Wood et al. | 252/477 R |
| 3,839,224 | 10/1974 | Yonehara et al. | 252/477 R |
| 3,939,002 | 2/1976 | Washbourne | 252/477 R |
| 3,992,327 | 11/1976 | Sadler et al. | 252/477 R |
| 3,998,758 | 12/1976 | Clyde | 252/477 R |
| 4,076,888 | 2/1978 | Pervgini et al. | 252/477 R |
| 4,083,905 | 4/1978 | Insley et al. | 252/477 R |
| 4,105,587 | 8/1978 | Blakely | 252/477 R |

*Primary Examiner*—Bradley Garris
*Attorney, Agent, or Firm*—Sughrue, Mion, Zinn, Macpeak & Seas

[57] ABSTRACT

A device for the purification of exhaust gas is disclosed. This purification device comprises a ceramic porous body having a three-dimensional network cellular structure with a plurality of interconnected voids and a bulk specific gravity of 0.25–0.6, an activated alumina layer covering the surfaces of cell strands of the ceramic porous body, and a noble metal catalyst layer supported on the activated alumina layer, or comprises a reactive member composed of the purification device as described above, and an agitating member composed of a ceramic porous body or a gas adsorbing member composed of a ceramic porous body and a gas adsorbent applied to the ceramic porous body.

8 Claims, 6 Drawing Figures

DEVICE FOR PURIFICATION OF EXHAUST GAS

This invention relates to a device for purifying exhaust gas such as smelly gas, carbon monoxide gas and the like produced from small-sized combustion equipment such as an oil combustion heater and so on during ignition, extinction or the like (hereinafter referred to as a purification device).

Lately, a demand for heaters of an oil combustion system has increased and these heaters have widely been used. In the oil combustion heater of this type, however, smelly gas, carbon monoxide gas and the like are produced just after the ignition or extinction and discharged outside of room, so that they are considered to be a cause of public nuisance such as atmospheric pollution and the like in a densely built-up area. On the other hand, most of the heaters, which are generally known as a forced-flue system, are replaced by indoor-type oil stoves in view of oil-saving. In this case, the room may be filled with smelly gas, carbon monoxide gas and the like just after the ignition or extinction, which is unfavourable in view of health.

Heretofore, it is known that exhaust gas produced from such heaters may be purified by using a noble metal catalyst as an oxidation catalyst for exhaust gas. In the small-sized oil combustion heater, however, there is no purification device suitable for purifying exhaust gas, so that it is usually practised to discharge the exhaust gas outside of room at most and the oxidation treatment for exhaust gas is not performed yet. As a result, there are problems such as the occurrence of bad smell in the densely built-up area and so on, the injuring of health due to the filling of exhaust gas inside of room and the like, so that it is increasingly required to perform the oxidation treatment for exhaust gas in the oil combustion heater and hence there is a requirement to develop purification devices suitable for purifying the exhaust gas.

In this connection, a purification device for purifying exhaust gas in the oil combustion heater should satisfy the following requirements:

(1) The pressure loss is low;
(2) The heat resistance is high;
(3) The heat capacity is small;
(4) It is necessary to have a structure capable of preventing direct passage of unreacted gas; and
(5) The pore volume is large.

That is, in the oil combustion heater, air required for complete combustion is supplied at most by utilizing a natural convection or a small-sized blower, so that when the pressure loss of the purification device is high, there may a fear of obstructing normal combustion. Further, combustion gas indicates a temperature of about a thousand or hundreds of degrees in a chamber of the oil combustion heater and is frequently a temperature of hundreds of degrees even after the heat exchange, so that the purification device must be a material having such a higher softening temperature to endure under the high temperature conditions. At the same time, the purification device is always exposed to a severe thermal impact in the repeatedly intermittent use between atmospheric or room temperature and higher temperature, so that it must have a material and structure capable of enduring under this severe heat condition. Furthermore, it is structurally preferable that the purification device disperses and mitigates heat stress and hardly accelerates the growth of cracks even if the cracks are produced due to the heat stress. In the oil combustion heater, the occurrence of smelly gas, carbon monoxide gas and the like is frequent just after the ignition or extinction, so that the oxidation reaction of the purification device for use in the oil combustion heater must rapidly rise even at a time of unsufficient temperature conditions just after the ignition. For this purpose, it is required to have a small heat capacity so that the temperature of the purification device must rapidly follow to the rising of environmental temperature and also may sensitively rise according to the heat of reaction. Since the smelly gas produced during the oil combustion odors even at a concentration of less than several ppm, a catalyst to be used in the purification treatment must have a high activity even at an area of a high conversion degree. However, the reaction rate generally changes from reaction controlling factor to diffusion controlling factor as the concentration of the reactant becomes very small. As a result, the reaction rate in the high conversion area is not highly increased only by increasing the activity of the catalyst. Therefore, it becomes important to enhance the diffusion of the reactant into the surface of the catalyst at the high conversion area. For this end, the purification device is required to have such a structure that the gas to be reacted is always contacted with the surface of the catalyst to accelerate the gas diffusion and prevent the direct passage of unreacted gas. Moreover, the purification device is necessary to have a large pore volume for sufficiently achieving the adhesion and activation of the catalyst and must have a high mechanical strength.

Now, it is necessary to develop purification devices satisfying the above mentioned requirements in order to purify the exhaust gas in the oil combustion heater.

It is, therefore, an object of the invention to provide purification devices suitable for use in the oxidation treatment of the exhaust gas in the oil combustion heater, which satisfy the above requirements (1)–(5) and particularly have a good rising property of catalytic activity at a low temperature and a high activity at the high conversion area, and develop an excellent effect as a diffusion controlling body requiring a high conversion degree in the treatment for exhaust gas of the oil combustion heater.

According to a first aspect of the invention, there is the provision of a device for purifying exhaust gas in an oil combustion heater, comprising a ceramic porous body having a three-dimensional network cellular structure with a plurality of interconnected voids and a bulk specific gravity of 0.25–0.6, an activated alumina layer applied to the surfaces of cell strands of said ceramic porous body in an amount of 3–30% by weight per the weight of said ceramic porous body, and a noble metal catalyst layer supported on said activated alumina layer.

This purification device is suitable for oxidizing and removing the exhaust gas such as smelly gas, carbon monoxide gas and the like produced from the oil combustion heater and acts as an excellent redox catalyst because it has a structure of closely contacting the passing gas with the cell strands of the ceramic porous body by supporting the noble metal catalyst on the activated alumina layer covering the cell strands. Particularly, the purification device is excellent in an initial rising property of the catalytic activity just after the ignition.

The inventors have made further investigations with respect to the purification device according to the first aspect of the invention and found out that when the exhaust gas is practically treated by mounting the purification device containing the noble metal catalyst according to the first aspect of the invention to the oil combustion heater, it is difficult to remove a significant amount of bad smell produced in the ignition or extinction by only the catalyst because the bad smell is produced at a temperature lower than that of activating the catalyst in the oil combustion heater, particularly indoor-type oil stove. In the small-sized combustion equipment of this type such as oil combustion heater or the like, a distance between the combustion position and the arranging position of the purification device cannot be widened, so that air required for complete combustion is supplied at most by utilizing a natural convection or a small-sized blower. As a result, exhaust gas produced from the heater flows into the purification device in the unhomogeneous state of component and temperature, so that the use efficiency of the catalyst supported on the purification device lowers and the performance of the catalyst itself cannot sufficiently be developed and hence the conversion degree of exhaust gas may be decreased. Particularly, as the thickness of the purification device mounted on the small-sized combustion equipment increases, the amount of the noble metal catalyst to be supported on the device increases, which brings about an economical problem. As a result, it is preferable to use the purification device having a relatively thin thickness of not more than 40 mm, usually about 10-20 mm. However, it has also been found that the above mentioned problems are apt to be caused when using the thin purification device.

Under the above circumstances, it is a first aspect of this invention to provide a purification device suitable for purifying exhaust gas of small-sized combustion equipments, which can satisfactorily remove the bad smell produced at the temperature lower than that of activating the catalyst in the ignition, extinction or the like and can effectively and efficiently develop the performance of the noble metal catalyst to effectively purify the exhaust gas even when the thickness of the device supporting the catalyst is relatively thin if the exhaust gas produced from the small-sized combustion equipment such as the oil combustion heater or the like flows into the device in the unhomogeneous state of component and temperature without dispersing and disturbing from the combustion position.

According to a second aspect of the invention, there is the provision of a purification device for purifying exhaust gas in a small-sized combustion equipment, comprising a reactive member composed of a ceramic porous body having a three-dimensional network cellular structure with a plurality of interconnected voids and a bulk specific gravity of 0.25-0.6, an activated alumina layer applied to the surfaces of cell strands of said ceramic porous body in an amount of 3-30% by weight per the weight of said ceramic porous body and a noble metal catalyst layer supported on said activated alumina layer, and an agitative member disposed on a flowing side of exhaust gas and composed of a ceramic porous body having a three-dimensional network cellular structure with a plurality of interconnected voids.

According to a third aspect of the invention, there is the provision of a purification device for purifying exhaust gas in a small-sized combustion equipment, comprising a reactive member composed of a ceramic porous body having a three-dimensional network cellular structure with a plurality of interconnected voids and a bulk specific gravity of 0.25-0.6, an activated alumina layer applied to the surfaces of cell strands of said ceramic porous body in an amount of 3-30% by weight per the weight of said ceramic porous body and a noble metal catalyst layer supported on said activated alumina layer, and a gas adsorbing member composed of a ceramic porous body having a three-dimensional network cellular structure with a plurality of interconnected voids and a gas adsorbent applied to the surfaces of cell strands of said ceramic porous body.

The invention will now be described in detail with reference to the accompanying drawings, wherein.

Figure 1:
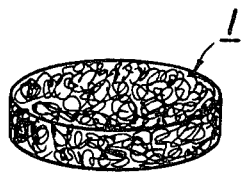
FIG. 1 is a perspective view of an embodiment of the purification device according to the first aspect of the invention.
Figure 2:
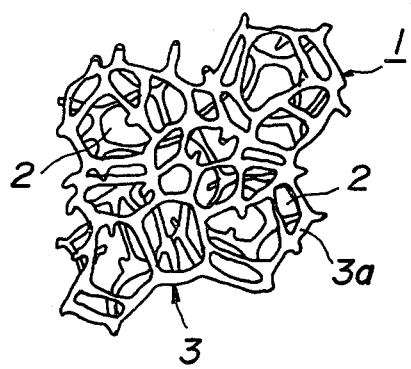
FIG. 2 is a partly enlarged side view of the embodiment shown in FIG. 1.
Figure 3:
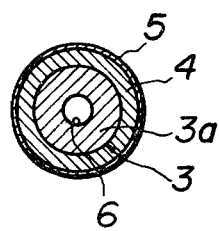
FIG. 3 is an enlarged sectional view of a cell strand in the ceramic porous body according to the invention.

In FIG. 1 is shown an embodiment of a purification device 1 for use in an exhaust gas treatment of an oil combustion heater according to the first aspect of the invention, which is manufactured by using an open-cell, flexible polyurethane foam as a substrate and replacing it with a ceramic material. The purification device 1 comprises a columnar ceramic porous body 3 having a three-dimensional network cellular structure with a plurality of interconnected voids 2 as shown in FIG. 2, an activated alumina layer 4 of $\gamma$-alumina or the like covering all the surfaces of cell strands 3a of the ceramic porous body 3, and a noble metal catalyst layer 5 supported on the activated alumina layer 4. In the central part of the cell strand 3a is formed a continuous cavity 6 corresponding to the shape of the polyurethane foam substrate as shown in FIG. 3. The purification device 1 (or ceramic porous body 3) has substantially the same cellular skeleton as that of the flexible polyurethane foam. Further, the ceramic porous body 3 has a bulk specific gravity of 0.25-0.6. Moreover, the activated alumina layer 4 uniformly covers the surface of the cell strand 3a in an amount of 3-30% by weight per the weight of the ceramic porous body 3.

The production of the purification device 1 will be described in greater detail below.

At first, a columnar flexible polyurethane foam (open-cell foam) having a substantially open-cell skeleton or three-dimensionally network cellular structure is dipped into a ceramic slurry. As the open-cell flexible polyurethane foam, use may be made of foams obtained after the removal of cell membranes by controlling of foaming, foams obtained after the removal of cell membranes by heat, an alkali or water pressure treatment and the like, but it is preferable to use the foams obtained by the alkali or heat treatment in view of the complete removal of cell membranes. Furthermore, the cell diameter of the flexible polyurethane foam is not particularly critical, but it is preferable within a range of 1-7 mm. Because, when the cell diameter of the flexible polyurethane foam to be used in the production of the purification device is less than 1 mm, the pressure loss of the resulting purification device becomes larger unfavourably, while when the cell diameter exceeds 7 mm, it is difficult to maintain the performance of the purification device at a high conversion degree. That is, it is preferable to use foams having a cell diameter of 1-7 mm in order to obtain the best result of the purification device.

Moreover, the kind and grain size of the ceramic to be used in the formation of the ceramic slurry are not particularly restricted, but it is desirable to use a ceramic material having a high heat resistance, preferably an α-alumina or a cordierite material. For this end, there is usually used a ceramic material consisting essentially of silica, alumina and magnesia, whose grain size being preferably not more than 40μ. As the dispersing medium for the ceramic slurry, there is usually used water, but another dispersing medium may be used or an adhesive and so on may be compounded.

Then, the flexible polyurethane foam covered around its cell strands with the fine particles of ceramic material is taken out from the ceramic slurry and thereafter an excessive amount of the slurry is removed by an air spraying or the like. Next, the adhered slurry is dried, solidified and fired at a firing temperature according to the slurry composition to conduct the sintering of the ceramic material and the carbonization of the flexible polyurethane foam, whereby there is formed the ceramic porous body 3 having substantially the same cellular structure as that of the foam and containing the continuous cavity 6 corresponding to the shape of the foam in its inside. In this case, it is preferable to perform the firing of the ceramic material at a temperature of 1,000°-1,800° C., preferably above 1,300° C. At such a higher firing temperature, there is obtained a ceramic porous body having a sufficiently high mechanical strength even when the bulk specific gravity is small. When the firing temperature is below the lower limit, the mechanical strength is often poor. The bulk specific gravity of the ceramic porous body 3 is rendered to a range of 0.25-0.6 by adjusting the cell diameter and porosity of the flexible polyurethane foam, the amount of the ceramic slurry adhered and the like. When the bulk specific gravity is within a range of 0.25-0.6, the resulting ceramic porous body has a small heat capacity, a good rising property of catalytic activity at a low temperature, a small pressure loss and a sufficient mechanical strength, which satisfy all the requirements for use in the purification device. When the bulk specific gravity exceeds 0.6, the above mentioned properties are not satisfactorily developed, while when the bulk specific gravity is less than 0.25, the mechanical strength lowers considerably.

Thus, the surfaces of cell strands 3a of the thus obtained ceramic porous body 3 are uniformly covered with an activated alumina such as γ-alumina or the like. For instance, the activated alumina layer 4 is formed on the surfaces of cell strands 3a of the ceramic porous body 3 having the cellular structure by applying a slurry of activated alumina material to the ceramic porous body previously fired at the elevated temperature and then drying and firing at a temperature of 400°-800° C. after the excessive amount of the slurry is removed so as to prevent the clogging of interconnected voids. Thus, the formation of the activated alumina layer 4 surely improves the catalyst supporting ability and catalytic activity. In the firing of the ceramic porous body, when the firing temperature is as high as above 1,000° C., the pore volume in the cell strand surface of the fired body (ceramic porous body) reduces and as a result, it is often difficult to adhere the significant amount of the catalyst component to the cell strand surface, but the formation of the activated alumina layer as described above surely achieves the effect of sufficiently adhering the catalyst component to the cell strand surface. In this case, the amount of the activated alumina applied should be within a range of 3-30% by weight per the weight of the ceramic porous body. When the amount of the activated alumina is less than 3% by weight, the pore volume becomes smaller and the adhesion of the catalyst component is insufficient, while when the amount exceeds 30% by weight, the formation of the activated alumina layer becomes wasteful.

Next, the noble metal catalyst layer 5 is supported on the activated alumina layer 4 by the conventional manner. For instance, a solution of 1 g of vanadium chloride in 3 l of diluted hydrochloric acid is added to a solution of 1 g of platinic acid hydrochloride in 3 l of distilled water and then a diluted hydrochloric acid is added to adjust pH to about 2 with stirring. Then, the ceramic porous body covered with γ-alumina is dipped into the resulting solution for about 1 hour, taken out from this solution and dried at 110° C.

The thus obtained purification device 1 has substantially the same cellular structure as the skeleton of the flexible polyurethane foam, wherein the activated alumina layer 4 is formed on the surface of cell strands 3a of the ceramic porous body 3 having a three-dimensional network cellular structure with a plurality of interconnected voids 2. Further, the purification device 1 supports a given catalyst (the use of noble metal catalyst is preferable because it is necessary to rapidly raise the catalytic activity at low temperature). The purification device 1 is used by arranging in a given passage for exhaust gas of an oil combustion heater.

According to the first aspect of the invention, the purification device 1 has a large pore volume and high catalyst supporting ability and activation ability because the surfaces of cell strands 3a of the ceramic porous body 3 are covered with not less than 3% by weight of the activated alumina layer 4. Furthermore, the purification device 1 is high in the activity at a high conversion area because it has the three-dimensional network cellular structure with a plurality of interconnected voids corresponding to the skeleton of the flexible polyurethane foam. Therefore, the exhaust gas produced from the oil combustion heater is sufficiently dispersed in the purification device without directly passing the unreacted gas therethrough and always comes into contact with the surface of the catalyst layer, and as a result the smelly gas, carbon monoxide gas and the like can surely be oxidized even at a low concentration. Thus, the purification device according to the first aspect of the invention develops excellent and unexpected effect as a diffusion controlling body requiring a high conversion degree in the treatment for exhaust gas of the oil combustion heater. Moreover, the purification device 1 has substantially the same structure as the skeleton of the flexible polyurethane foam and the ceramic porous body 3 constituting the device has a bulk specific gravity of 0.25-0.6, so that the specific heat is small and also the heat capacity is small. As a result, the purification device rapidly follows to the rising of atmospheric temperature and can sensitively rise according to the heat of reaction, so that the oxidation reaction rapidly rises even at a time of unsufficient temperature conditions just after the ignition, whereby there can smoothly be performed the oxidation removal of smelly gas, carbon monoxide gas and the like produced at a low temperature just after the ignition. Since the purification device 1 has a structure containing the continuous cavity 6 formed inside the cell strand 3a of the ceramic porous body 3, the heat capacity is further decreased without lowering the mechanical strength, so that the rising property of the catalytic activity at low temperature is surely improved and the exhaust gas treatment is effectively achieved.

Furthermore, the purification device 1 is composed mainly of the ceramic porous body 3 having the bulk specific gravity of 0.25–0.6 and the same cellular structure as that of the polyurethane foam and provided at its surface with the activated alumina layer 4 and catalyst layer 5, so that the pressure loss of the device is low and as a result, it is intended to perform complete combustion only by supplying air by natural convection or small-sized blower without obstructing normal combustion of the oil combustion heater. And also, the heat resistance of the purification device 1 is very excellent, so that this device is sufficiently durable to high-temperature exhaust gas or repeated thermal shock and satisfactorily performs the dispersion and mitigation of heat stress. As a result, the continuous growth of cracks is prevented even if these cracks are produced due to the heat stress.

The purification device according to the first aspect of the invention is very practicable for use in the exhaust gas purification of the oil combustion heater because it satisfactorily develops the performance of the catalyst and at the same time performs the sure oxidation removal of exhaust gas discharged from the oil combustion heater, smelly gas and carbon monoxide gas produced in the ignition or extinction of the heater and the like.

In the embodiment of FIG. 1, the purification device is manufactured by starting from the flexible polyurethane foam as a substrate, but the other synthetic resin foam or porous body having an open-cell structure may be used as the substrate. In the latter case, the resulting purification devices have substantially the same cellular structure as the skeleton of the synthetic resin foam and develop the same effect as described above. And also, the manufacture of the purification device is not intended to be limited to the above mentioned process. Moreover, the shape and size of the purification device may optionally be selected in accordance with use conditions.

The purification device as shown in FIG. 1 is constructed with a ceramic porous body having a three-dimensionally network cellular structure with a plurality of interconnected voids and a bulk specific gravity of 0.25–0.6, an activated alumina layer applied on the surfaces of cell strands of the ceramic porous body in an amount of 3–30% by weight per the weight of the ceramic porous body and a noble metal catalyst layer supported on the activated alumina layer, so that it is characterized by having a small heat capacity, a good rising property of catalytic activity at low temperature, a prevention of direct passage of unreacted gas, a high activity at a high conversion area, a sufficient adhesion of catalyst, a low pressure loss, no obstruction of combustion of oil combustion heaters and a high heat resistance. Therefore, the purification device is effectively used for treating the exhaust gas of the oil combustion heater.

Figure 4:
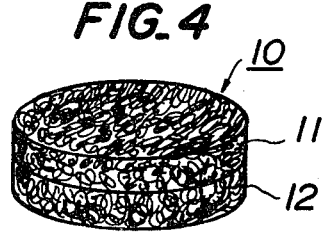
FIG. 4 is a perspective view of an embodiment of the purification device according to the second aspect of the invention.

In FIG. 4 is shown an embodiment of the purification device according to the second aspect of the invention. In this case, the purification device 10 comprises a disc-like reactive member 11 and a disc-like agitative member 12 arranged on a flowing side of exhaust gas.

The reactive member 11 is the same construction as shown in FIG. 3. That is, the reactive member 11 is composed of a ceramic porous body 3 having a three-dimensional network cellular structure with a plurality of interconnected voids for passage of exhaust gas, which is formed by applying a ceramic slurry of α-alumina, cordierite material or the like to a flexible polyurethane foam having an open-cell skeletal structure and a cell diameter of 1–7 mm and then firing it at a temperature of, for example, 1,000°–1,800° C. to carbonize and remove the foam, an activated alumina layer 4 of α-alumina or the like covering all the surfaces of cell strands 3a of the ceramic porous body 3, and a noble metal catalyst layer 5 of platinum or the like supported on the activated alumina layer 4. In this case, the ceramic porous body 3 is formed to have a bulk specific gravity of 0.25–0.6 in view of heat capacity, pressure loss, mechanical strength and the like, while the activated alumina layer 4 is applied to the cell strands 3a in an amount of 3–30% by weight per the weight of the ceramic porous body 3.

The agitative member 12 is composed of a ceramic porous body having a three-dimensional network cellular structure with a plurality of interconnected voids for passage of exhaust gas, which is formed by applying a ceramic slurry of α-alumina or cordierite material to a flexible polyurethane foam having an open-cell skeletal structure and firing it to carbonize and remove the foam in the same manner as described in the formation of the ceramic porous body 3. In this case, the agitative member 12 (i.e. ceramic porous body) is preferable to have a bulk specific gravity of 0.25–0.6.

Figure 5:
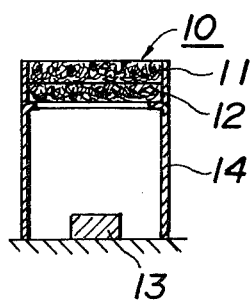
FIG. 5 is a schematically sectional view illustrating the use state of the embodiment shown in FIG. 5.

The thus obtained purification device 10 is used by arranging in a given passage for exhaust gas of an oil combustion heater as shown in FIG. 5, wherein numeral 13 is a combustion portion of the oil combustion heater and numeral 14 is a cylindrical shielding plate arranged to cover the combustion portion 13. In this case, the purification device 10 is arranged so that the agitative member 12 directs toward the combustion portion 13 and is mounted on the upper part of the shielding plate 14 to cover the upper opening part of the plate 14. As a result, the exhaust gas generated from the combustion portion 13 flows into the agitative member 12 of the purification device 10 to pass through the interconnected voids thereof and then flows into the reactive member 11 to pass through the interconnected voids thereof, during which the exhaust gas is purified by the action of the supported catalyst layer 5.

In the purification device 10, the agitative member 12 composed of the ceramic porous body is arranged on the flowing side of the exhaust gas to the reactive member 11, so that even when the exhaust gas generated from the oil combustion heater or the like flows into the agitative member 12 in the unhomogeneous state of component and temperature without dispersion and disturbance, the exhaust gas surely comes into contact with the cell strands of the ceramic porous body constituting the agitative member 12 and is effectively agitated by the agitative member 12. As a result, the exhaust gas is flowed from the agitative member 12 to the reactive member 11 in the homogeneous state of component and temperature, so that the catalyst layer 5 of the reactive member 11 is efficiently utilized to purify the exhaust gas. From the various examinations, it has been confirmed that when a slit plate provided with a great number of slits or a honeycomb structure is used as the agitative member 12 instead of the ceramic porous body, sufficient agitating effect cannot be expected, while when using the agitative member composed of the ceramic porous body, the sure agitating effect of the exhaust gas is first achieved. That is, the agitative member 12 contributes to effectively develop the performance of the catalyst layer 5 in the reactive member 11 so as to efficiently purify the exhaust gas even when the thickness of the reactive member 11 is as relatively thin as not more than 40 mm, usually about 10-20 mm. In other words, the agitative member 12 serves to surely develop the performances of the reactive member 11 composed mainly of the ceramic porous body even when the thickness of the reactive member is thin.

Since the agitative member 12 is composed of the ceramic porous body, the pressure loss is low. Therefore, the agitative member 12 does not inconveniently obstruct the normal combustion of the oil combustion heater when air is supplied by natural convection or by a small-sized blower, and surely catches oil mist, soot and the like scattered out from the combustion portion 13 to prevent the poisoning of the catalyst layer 5 in the reactive member 11. (Moreover, the oil mist and the like are burnt with the rising of the exhaust gas temperature and treated in the reactive member 11.)

Particularly, the above mentioned effect of the agitative member 12 is satisfactorily achieved when the bulk specific gravity of the ceramic porous body constituting the agitative member is 0.25-0.6. And also, the agitative member 12 sufficiently develops its performance even at a relatively thin thickness of not more than 40 mm, usually 10-20 mm.

In the embodiment of FIG. 4, the purification device 10 is formed in a disc shape as a whole, but there may be applied various modifications such as a topped cylindrical shape covering the combustion portion 13 and the like. Furthermore, the reactive member 11 is closely laminated on the agitative member 12 in the embodiment of FIG. 4, but the agitative member 12 may be arranged at a given distance apart from the reactive member 11 or the purification device 10 may be composed of a single ceramic porous body, an upper half portion of which being a reactive member provided with an activated alumina layer and a catalyst layer therein and the other half portion of which being an agitative member. Moreover, the bulk specific gravity, porosity, thickness and the like of each of the reactive and agitative members may be changed in accordance with use purpose and the like without departing from the spirit of the invention.

According to the second aspect of the invention, even if the exhaust gas generated from the small-sized combustion equipment such as oil combustion heaters or the like flows into the purification device in the unhomogeneous state of component and temperature without dispersing and disturbing from the combustion portion, the exhaust gas is fully agitated and homogenized in the agitative member and thereafter flowed into the reactive member, so that the performance of the catalyst layer can effectively and efficiently be developed to purify the exhaust gas. In this case, the performance of the catalyst layer is surely developed even when the thickness of the reactive member if relatively thin, so that the reactive member supporting an expensive noble metal catalyst may be thinned and as a result, the production cost is advantageously reduced. Furthermore, the oil mist, soot and the like can surely be caught by the agitative member, so that the poisoning of the catalyst layer in the reactive member is prevented and hence the purification device can stably and surely purify the exhaust gas over a long period of time.

Figure 6:
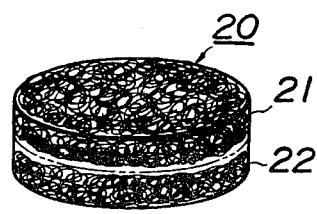
FIG. 6 is a perspective view of an embodiment of the purification device according to the third aspect of the invention.

In FIG. 6 is shown an embodiment of the purification device according to the third aspect of the invention, which is formed into a disc shape as a whole. This purification device 20 comprises a single body obtained by dividing into a reactive member 21 and a gas adsorbing member 22 at a position of dot-dashed line shown in FIG 6. The reactive member 21 is the same construction as shown in FIG. 3; that is, the reactive member 21 is composed of a ceramic porous body 3 having a three-dimensional network cellular structure with a plurality of interconnected voids for passage of exhaust gas, which is formed by applying a ceramic slurry of $\alpha$-alumina, cordierite material or the like to a flexible polyurethane foam having an open-cell skeletal structure and a cell diameter of 1-7 mm and then firing it at a temperature of, for example, 1,000°-1,800° C. to carbonize and remove the foam, an activated alumina 4 of $\gamma$-alumina or the like covering all the surfaces of cell strands 3a of the ceramic porous body 3, and a noble metal catalyst layer 5 of platinum or the like supported on the activated alumina layer 4. On the other hand, the gas adsorbing member 22 is composed of the same ceramic porous body 3 as described above and an activated alumina layer 4 acting as a gas absorbing layer and covering all the surfaces of cell strands 3a of the ceramic porous body 3.

In this case, the ceramic porous body is formed to have a bulk specific gravity of 0.25-0.6 in view of heat capacity, pressure loss, mechanical strength and the like, while the activated alumina layer 4 is applied to the cell strands 3a in an amount of 3-30% by weight per the weight of the ceramic porous body 3.

The thus obtained purification device 20 is used by arranging in a given passage for exhaust gas of an oil combustion heater as shown in FIG. 5 like the case of using the purification device 10. In this case, the purification device 20 is so arranged that the gas absorbing member 22 directs toward the combustion portion 13 and mounted on the upper part of the shielding plate 14 so as to cover the upper opening part of the plate 14. As a result, the exhaust gas generated from the combustion portion 13 flows into the gas absorbing member 22 of the purification device 20 to pass through the interconnected voids thereof and then flows into the reactive member 21 to pass through the interconnected voids thereof, during which the exhaust gas is purified by the action of the supported catalyst layer 5.

In the purification device 20, the gas adsorbing member 22 provided with the activated alumina layer 4 covering the cell strands 3a of the ceramic porous body 3 is arranged on the flowing side of the exhaust gas to the reactive member 21, so that even if bad smell is produced at a temperature lower than that of activating the catalyst layer 5 of the reactive member 21 in the ignition or extinction of the oil combustion heater, the gas adsorbent of the gas adsorbing member 22 (i.e. activated alumina layer 4) surely adsorbs and deodorizes the bad smelly gas and as a result, it is prevented to escape the bad smell into the room. In this case, the gas adsorbing member 22 is composed mainly of the ceramic porous body having a bulk specific gravity of 0.25-0.6, so that the pressure loss is low and as a result, the gas adsorbing member 22 does not inconveniently obstruct the normal combustion of the oil combustion heater when air is supplied by natural convection or by a small-sized blower and also the exhaust gas surely comes into contact with the cell strands of the gas adsorbing member 22 without directly passing therethrough, whereby the smelly gas is surely adsorbed and deodorized with the gas adsorbent (activated alumina layer 4). From the various examinations, it has been confirmed that when the conventional alumina ball or molecular sieve pellet is used as the gas adsorbing member, the pressure loss is high and it is unsuitable for use in the small-sized combustion equipment such as oil combustion heaters or the like, while when the gas adsorbing member is composed mainly of the ceramic porous body covering at its cell strand surfaces with the activated alumina layer 4 as described above, the pressure loss is low and the bad smelly gas produced in the ignition or extinction is surely removed by contacting the exhaust gas with the activated alumina layer 4 of the gas adsorbing member even if the exhaust gas generated from the small-sized combustion equipment flows into the gas adsorbing member 22 in the unhomogeneous state of component and temperature without dispersion and disturbance. That is, it has been found that when the purification device 20 is mounted on, for example, an indoor-type oil stove and the ignition and extinction are repeated in a closed room, the effect of removing the bad smell is considerably improved.

The bad smelly gas produced at a temperature lower than that of activating the catalyst layer 5 is adsorbed with the activated alumina layer 4, but when the catalyst layer 5 is activated at an elevated temperature, the smelly gas is separated away from the layer 4 and then deodorized by the reaction member 21.

The gas adsorbing member 22 acts to agitate and homogenize the exhaust gas to efficiently perform the purification of the exhaust gas in the reactive member 21. That is, even if the exhaust gas generated from the combustion portion 13 flows into the gas adsorbing member 22 in the unhomogeneous state of component and temperature without dispersion and disturbance as described above, the exhaust gas is surely contacted with the cell strands of the gas adsorbing member 22 and effectively agitated up to the homogeneous state of component and temperature and thereafter flowed into the reactive member 21, so that the performance of the catalyst layer 5 in the reactive member 21 is efficiently developed to satisfactorily purify the exhaust gas. That is, the gas adsorbing member 22 contributes to effectively develop the performance of the catalyst layer 5 in the reactive member 21 to efficiently purify the exhaust gas even when the thickness of the reactive member 21 is as relatively thin as not more than 40 mm, usually about 10-20 mm. In other words, the gas adsorbing member serves to surely develop the performances of the reactive member 21 composed mainly of the ceramic porous body even when the thickness of the reactive member is thin.

Even if oil mist and the like are scattered out from the combustion portion 13, the gas adsorbing member 22 surely catches the oil mist to prevent the poisoning of the catalyst layer 5 in the reactive member 21.

Furthermore, the gas adsorbing member 22 satisfactorily develops its performance even at a relatively thin thickness of not more than 40 mm, usually 10-20 mm.

In the embodiment of FIG. 6, the purification device 20 is constructed by forming the reactive member 21 provided with the catalyst layer 5 and the gas adsorbing member 22 in a single ceramic porous body 3 covered at its cell strand surfaces with the activated alumina layer 4, so that the production step is not only simplified, but also the temperatures of the reactive member 21 and the gas adsorbing member 22 are equalized to ensure the purification reaction of the separated gases and also the device becomes simple and compact.

The purification device 20 is formed in a disc shape as a whole, but there may be applied various modifications such as a topped cylindrical shape covering the combustion portion 13 and the like. Furthermore, the reactive member 21 and the gas adsorbing member 22 are formed in the single ceramic porous body at once in the embodiment of FIG. 6, but these members may be separately formed and laminated one upon the other. In the latter case, the gas adsorbing member may be arranged at a given distance apart from the reactive member. Moreover, as the gas adsorbent of the gas adsorbing member, there may preferably be used zeolite having good heat resistance and fire resistance, and the like.

According to the third aspect of the invention, the purification device consists of a reactive member composed mainly of the ceramic porous body supporting the catalyst layer and a gas adsorbing member composed of the ceramic porous body covered with the gas adsorbent and the gas adsorbing member is arranged on a flowing side of exhaust gas, so that the smelly gas produced at a temperature lower than that of the catalyst during the ignition or extinction is adsorbed and removed by the gas adsorbent of the gas adsorbing member and also the adsorbed smelly gas is separated out from the gas adsorbing member after the catalyst is activated at a given elevated temperature and then deodorized by the reactive member. Further, even when the exhaust gas generated from the small-sized combustion equipment such as oil combustion heaters or the like flows into the purification device in the unhomogeneous state of component and temperature without dispersing and disturbing from the combustion portion, not only the smelly gas is surely contacted with the gas adsorbent, but also the exhaust gas is fully agitated and homogenized by the gas adsorbing member and then flowed into the reactive member. As a result the performance of the catalyst layer can effectively and efficiently be developed to purify the exhaust gas. In this case, the performance of the catalyst layer is surely developed even when the thickness of the reactive member is thin, so that the reactive member supporting an expensive noble metal catalyst may be thinned, which is very advantageous in the production cost. Moreover, the oil mist, soot and the like are surely caught by the gas adsorbing member to prevent the poisoning of the catalyst layer in the reaction member, so that the exhaust gas can stably and surely be purified over a long period of time.

The following examples are given in illustration of the invention and are not intended as limitations thereof.

Comparative Example 1

To a ceramic honeycomb produced by extrusion molding and having 15 holes per inch and a disc shape of 150 mm diameter and 10 mm thickness was applied 20% by weight, based on the weight of the honeycomb, of an activated alumina and then a mixed catalyst of platinum and palladium of 1:1 was supported thereon in an amount of 0.08 g per 1 l to form a purification device A.

EXAMPLE 1

As a substrate was provided a skeletal reticulated flexible polyurethane foam having 13 interconnected voids per inch and a disc shape of 150 mm diameter and 10 mm thickness.

In an agitating tank was charged a powdery mixture of 50 parts of cordierte made by Marusu Yuyaku Co., Ltd. as a trade name K-8 and 50 parts of alumina made by Sumitomo Aluminum Co., Ltd. as a trade name AM-31 together with a liquid mixture of silica sol and water having a mixing ratio of 2:1, and after the resulting ceramic slurry was agitated for about 24 hours, the viscosity was adjusted to 1.5 poises.

The flexible polyurethane foam was impregnated with the ceramic slurry. After the foam was taken out from the slurry, the excess amount of the slurry removed without deforming the foam. Next, the foam adhered with the slurry was dried at 70° C. for 24 hours and then impregnated with the ceramic slurry having a viscosity of about 0.2 poises. After the removal of excess slurry, the foam adhered with the slurry was dried at 70° C. for 24 hours. The above procedure was repeated 4 times so as to obtain a given bulk specific gravity of a ceramic porous body after fired. Then, the flexible polyurethane foam covered with the ceramic slurry was fired at about 1,350° C. to obtain a ceramic porous body having a bulk specific gravity of 0.4 without clogging in any directions.

An activated alumina made by Sumitomo Aluminum Co., Ltd. as a trade name A-11 was dispersed in water containing 15% of silica sol to form an alumina slurry having a viscosity of 2 poises. Then, the ceramic porous body was thoroughly impregnated with the alumina slurry, dried at 70° C. for 12 hours after the removal of excess slurry and then fired at 600° C. for 1 hour to obtain the ceramic porous body covered with 20% by weight, based on the weight of the ceramic porous body, of the activated alumina layer. Then, a mixed catalyst of platinum and palladium of 1:1 was supported on the activated alumina layer in an amount of 0.08 g per 1 l to form a purification device B.

EXAMPLE 2

The same ceramic porous body having a three-dimensional network cellular structure with 13 interconnected voids per inch and a bulk specific gravity of 0.4 as described in Example 1 was used as an agitative member and then united with the purification device of Example 1 as a reactive member to form a purification device C.

EXAMPLE 3

To the same ceramic porous body as described in Example 1 was applied 20% by weight, based on the weight of the ceramic porous body, of an activated alumina as a gas adsorbent to form a gas adsorbing member. Then, the gas adsorbing member was united with the purification device of Example 1 as a reactive member to form a purification device D.

Experiment

Each of these purification devices was disposed at a position of 9 cm separated upward from a combustion portion of an indoor-type oil stove as shown in FIG. 5 and then the purification performance by a feeling test, carbon monoxide content and total hydrocarbon content were measured to obtain results as shown in the following Tables 1-3.

1. Feeling test

The exhaust gas generated from the combustion portion was sampled out at a position beneath the purification device as a non-treated gas and at a position above the purification device as a treated gas, respectively. Each sampled gas was taken out from a polytetrafluoroethylene bag in a well-ventilated room to estimate its offensive smell.

TABLE 1

| Purification device | After 30 seconds of ignition | | After 5 minutes of extinction | |
|---|---|---|---|---|
| | temperature of upper surface of purification device, °C. | Offensive smell of treated gas | temperature of upper. surface of purification device, °C. | Offensive smell of treated gas |
| A | 21 | the same strong smell as that of non-treated gas | 106 | the same strong smell as that of non-treated gas |
| B | 53 | smell fairly weaker than that of non-treated gas | 28 | smell fairly weaker than that of non-treated gas |
| C | 45 | smell fairly weaker than that of non-treated gas | 45 | weak smell |
| D | 43 | substantially odorless | 45 | substantially odorless |

2. Carbon monoxide content

After 10 minutes of ignition, the treated exhaust gas was sampled out in the same manner as described above and its carbon monoxide content was measured by means of an apparatus CGT 101 made by Shimazu Seisakusho.

TABLE 2

| Purification device | None | A | B | C | D |
|---|---|---|---|---|---|
| CO content, ppm | 30 | 25 | 6 | <1 | <1 |

3. Total hydrocarbon content

The total hydrocarbon content of the exhaust gas was analyzed by a gas chromatography of FID system.

TABLE 3

| Purification device | After 30 seconds of ignition | | | After 6 minutes of ignition | | | After 5 minutes of extinction | | |
|---|---|---|---|---|---|---|---|---|---|
| | temperature of upper surface of purification device, °C. | in non-treated gas, ppm | in treated gas, ppm | temperature of upper surface of purification device, °C. | in non-treated gas, ppm | in treated gas, ppm | temperature of upper surface of purification device, °C. | in non-treated gas, ppm | in treated gas, ppm |
| A | 21 | 10 | 8 | 590 | 2.5 | non-measurable* | 106 | 150 | 140 |
| B | 53 | 15 | 15 | 620 | 2.5 | non-measurable* | 28 | 150 | 50 |
| C | 45 | 10 | 8 | 615 | 2.5 | non-measurable* | 45 | 150 | 50 |
| D | 43 | 20 | 3 | 615 | 2.5 | non-measurable* | 45 | 150 | 10 |

Note
*The exhaust gas was completely purified, so that the measured value of total hydrocarbon content was not indicated by the gas chromatography.

As apparent from Tables 1–3, the purification devices according to the invention are very effective for purifying the exhaust gas generated from the small-sized combustion equipment such as oil combustion heaters or the like.

What is claimed is:

1. A device for the purification of exhaust gas, comprising a ceramic porous body having a three-dimensional network cellular structure with a plurality of interconnected voids and a bulk specific gravity of 0.25–0.6, said ceramic porous body being formed by adhering a ceramic slurry containing grains of a ceramic material having a grain size not exceeding 40μ to an open-cell synthetic resin foam and firing it to remove the foam by carbonization and having substantially the same cellular structure as that of the foam, an activated alumina layer applied to the surfaces of cell strands of said ceramic porous body in an amount of 3–30% by weight per the weight of said ceramic porous body, and a noble metal catalyst layer supported on said activated alumina layer.

2. The device as claimed in claim 1, wherein a continuous cavity is formed in the central portions of cell strands of said ceramic porous body.

3. The device as claimed in claim 1, wherein said open-cell synthetic resin foam is an open-cell, flexible polyurethane foam.

4. A device for the purification of exhaust gas, comprising a reactive member composed of a ceramic porous body having a three-dimensional network cellular structure with a plurality of interconnected voids and a bulk specific gravity of 0.25–0.6, said ceramic porous body being formed by adhering a ceramic slurry containing grains of a ceramic material having a grain size not exceeding 40μ to an open-cell synthetic resin foam and firing it to remove the foam by carbonization and having substantially the same cellular structure as that of the foam, an activated alumina layer applied to the surfaces of cell strands of said ceramic porous body in an amount of 3–30% by weight per the weight of said ceramic porous body and a noble metal catalyst layer supported on said activated alumina layer, and an agitative member disposed on an inlet side of said exhaust gas opposite to said reactive member and composed of a ceramic porous body having a three-dimensional network cellular structure with a plurality of interconnected voids.

5. The device as claimed in claim 4, wherein said reactive member and said agitating member are formed in a common ceramic porous body.

6. A device for the purification of exhaust gas, comprising a reactive member composed of a first ceramic porous body having a three-dimensional network cellular structure with a plurality of interconnected voids and a bulk specific gravity of 0.25–0.6, said first ceramic porous body being formed by adhering a ceramic slurry containing grains of a ceramic material having a grain size not exceeding 40μ to an open-cell synthetic resin foam and firing it to remove the foam by carbonization and having substantially the same cellular structure as that of the foam, an activated alumina layer applied to the surfaces of cell strands of said first ceramic porous body in an amount of 3–30% by weight per the weight of said first ceramic porous body and a noble metal catalyst layer supported on said activated alumina layer, and a gas adsorbing member disposed on an inlet side of said exhaust gas opposite to said reactive member and composed of a second ceramic porous body having a three-dimensional network cellular structure with a plurality of interconnected voids and a gas adsorbent applied to the surface of cell strands of said second ceramic porous body.

7. The device as claimed in claim 6, wherein said reactive member and said gas adsorbing member are formed in a common ceramic porous body.

8. The device as claimed in claim 6, wherein said gas adsorbent is a zeolite or an activated alumina.

* * * * *